United States Patent
Graham et al.

(10) Patent No.: US 7,153,113 B2
(45) Date of Patent: Dec. 26, 2006

(54) MOLDS HAVING A VENEERED PEDESTAL FOR FORMING A FOAM OBJECT

(75) Inventors: Craig Jay Graham, Eastman, GA (US); Nobuo Fujisawa, Macon, GA (US); Wolfgang Coronel, Macon, GA (US)

(73) Assignee: YKK Corporation of America, Marietta, GA (US)

( * ) Notice: Subject to any disclaimer, the term of this patent is extended or adjusted under 35 U.S.C. 154(b) by 451 days.

(21) Appl. No.: 10/626,892

(22) Filed: Jul. 24, 2003

(65) Prior Publication Data

US 2005/0017407 A1    Jan. 27, 2005

(51) Int. Cl.
*B29C 33/16* (2006.01)
*B29C 44/12* (2006.01)

(52) U.S. Cl. .................. 425/3; 425/117; 425/127; 425/817 R; 249/91

(58) Field of Classification Search .............. 425/3, 425/DIG. 33, 117, 127, 472, 817 R; 249/91, 249/114.1, 205; 264/275, 276, 46.4
See application file for complete search history.

(56) References Cited

U.S. PATENT DOCUMENTS

| | | | | |
|---|---|---|---|---|
| 2,902,721 A * | 9/1959 | Heuer | ............... | 264/263 |
| 3,127,457 A * | 3/1964 | Di Pinto | ............... | 264/54 |
| 4,842,916 A * | 6/1989 | Ogawa et al. | ............... | 428/100 |
| 4,931,344 A | 6/1990 | Ogawa | | |
| 5,540,970 A | 7/1996 | Banfield | | |
| 5,603,395 A * | 2/1997 | Mabee | ............... | 192/70.13 |
| 5,665,449 A | 9/1997 | Billerant | | |
| 5,736,217 A | 4/1998 | Banfield | | |
| 5,766,385 A * | 6/1998 | Pollard et al. | ............... | 156/251 |
| 5,766,723 A * | 6/1998 | Oborny et al. | ............... | 428/100 |
| 5,786,061 A * | 7/1998 | Banfield | ............... | 428/100 |
| 5,795,640 A | 8/1998 | Billerant | | |
| 5,840,398 A | 11/1998 | Billerant | | |
| 5,900,303 A | 5/1999 | Billerant | | |
| 5,922,436 A | 7/1999 | Banfield | | |
| 5,935,500 A | 8/1999 | Stanton | | |
| 6,148,487 A * | 11/2000 | Billarant | ............... | 24/442 |
| 6,875,390 B1 * | 4/2005 | Cowelchuk | ............... | 264/255 |
| 2002/0022065 A1 | 2/2002 | Marshall | | |
| 2002/0066976 A1 * | 6/2002 | Cloutier et al. | ............... | 264/248 |

FOREIGN PATENT DOCUMENTS

JP    2001-190311    *   7/2001

OTHER PUBLICATIONS

Computer translation for JP 2001-190311.*

* cited by examiner

*Primary Examiner*—Donald Heckenberg
(74) *Attorney, Agent, or Firm*—Everest Intellectual Property Law Group; Michael S. Leonard

(57) ABSTRACT

A mold shim or insert is disclosed, which is placed between the surface of a forming mold or mold magnet and a fastener strip that is to be molded into a foam object. The mold shim compensates for the variability of the mold surface and provides a more even surface for the fastener strip to seal against —thereby preventing fouling of the strip's fastening elements during the molding process. Alternative embodiments of the invention are not used with a fastener strip, but instead have engaging members on their non-mold-proximate surface for engaging clips or wires which are thereby embedded into the foam object during the molding process.

10 Claims, 21 Drawing Sheets

MOLDS HAVING A VENEERED PEDESTAL FOR FORMING A FOAM OBJECT

BACKGROUND

1. Field of the Invention

The invention is in the area of fasteners which are molded into foam seat cushions or other objects. In an embodiment a veneer, also referred to as a mold shim or insert, is placed between the surface of a forming mold or mold magnet and the fastener strip that is to be in-molded. The veneer compensates for the variability of the mold surface and provides a more even surface for the fastener strip to seal against—thereby preventing fouling of the strip's fastening elements during the molding process. Alternative embodiments of the invention are not used with a fastener strip, but instead have engaging members on their non-mold-proximate surface for engaging clips or wires which are thereby embedded into the foam object during the molding process.

2. Description of the Related Art

A limited number of special molds for forming foam seat cushions with in-molded fastener strips are disclosed in the prior art. As examples, U.S. Pat. Nos. 5,665,449; 5,795,640; 5,840,398; and 5,900,303; all to Billerant, show end dams or ridges built into the mold that seal against areas devoid of hooks on a fastener strip.

U.S. Pat. No. 4,931,344 to Ogawa and U.S. Pat. Nos. 5,540,970; 5,736,217; and 5,922,436; all to Banfield, show magnetically attractable shims or metal strips on the hook side of the fastener strip. However, these magnetically attractable shims or strips are permanently affixed to the fastener strip, and remain with the strip after it is molded into the foam seat cushion. This is markedly different from the invention. The invention is not permanently affixed to the fastener strip, but is instead only temporarily affixed to the fastener strip by magnetic attraction during the molding process. The invention remains with the mold after the completed foam seat cushion is removed.

U.S. Pat. No. 5,935,500 to Stanton discloses a compression mold for forming golf balls, with rubber shims located between the outer mold frame and the golf ball half-molds. However, these rubber shims have a physical structure very different from the invention, and further are not located between the inner mold surface and a fastener strip, clip, wire, or other device being molded into an object.

U.S. Pub. Appl. # 2002/0022065 of Marshall also discloses a mold for manufacturing golf balls, having a spacer plate mounted on the mold frame. However, this spacer plate is not located between the inner mold surface and a fastener strip, clip, wire, or other device being molded into an object, and serves an entirely different function from that of the invention.

Nothing in the prior art discloses a shim or insert located between the mold surface or mold magnet and the fastener strip, in order to compensate for the variability of the mold surface and provide a more even surface for the foam bun fastener strip to seal against. Such a mold shim or insert would help prevent fouling of the strip's fastening elements during the molding process and would thus provide a significant advantage over the prior art.

Accordingly, several objects and advantages of the invention are:

To provide a way to compensate for the variability of the mold surface and provide a more even surface for the fastener strip to seal against—thereby preventing fouling of the strip's fastening elements during the molding process.

To provide a readily changeable "platform" to which clips, wires, and the like can be attached for embedding into a foam object.

To provide means to facilitate positioning and aligning the fastener strip on the mold shim, and thereby on the forming mold.

To provide a flexible, easily changeable way to mold fasteners, including fastener strips, clips, wires, or other devices into an object at various depths.

Further objects and advantages of the invention will become apparent from a consideration of the drawings and ensuing description.

SUMMARY

In an embodiment, the invention has a veneer, also referred to as a mold shim or insert, placed between the surface of a forming mold or mold magnet and a fastener strip that is to be molded into an object. The veneer compensates for the variability of the mold surface and provides a more even surface for the foam bun fastener strip to seal against—thereby preventing fouling of the strip's fastening elements during the molding process. Alternative embodiments of the invention are not used with a fastener strip, but instead have engaging members on their non-mold-proximate surface for engaging clips or wires which are thereby embedded into the foam object during the molding process.

DETAILED DESCRIPTION OF THE INVENTION

Figure 1:
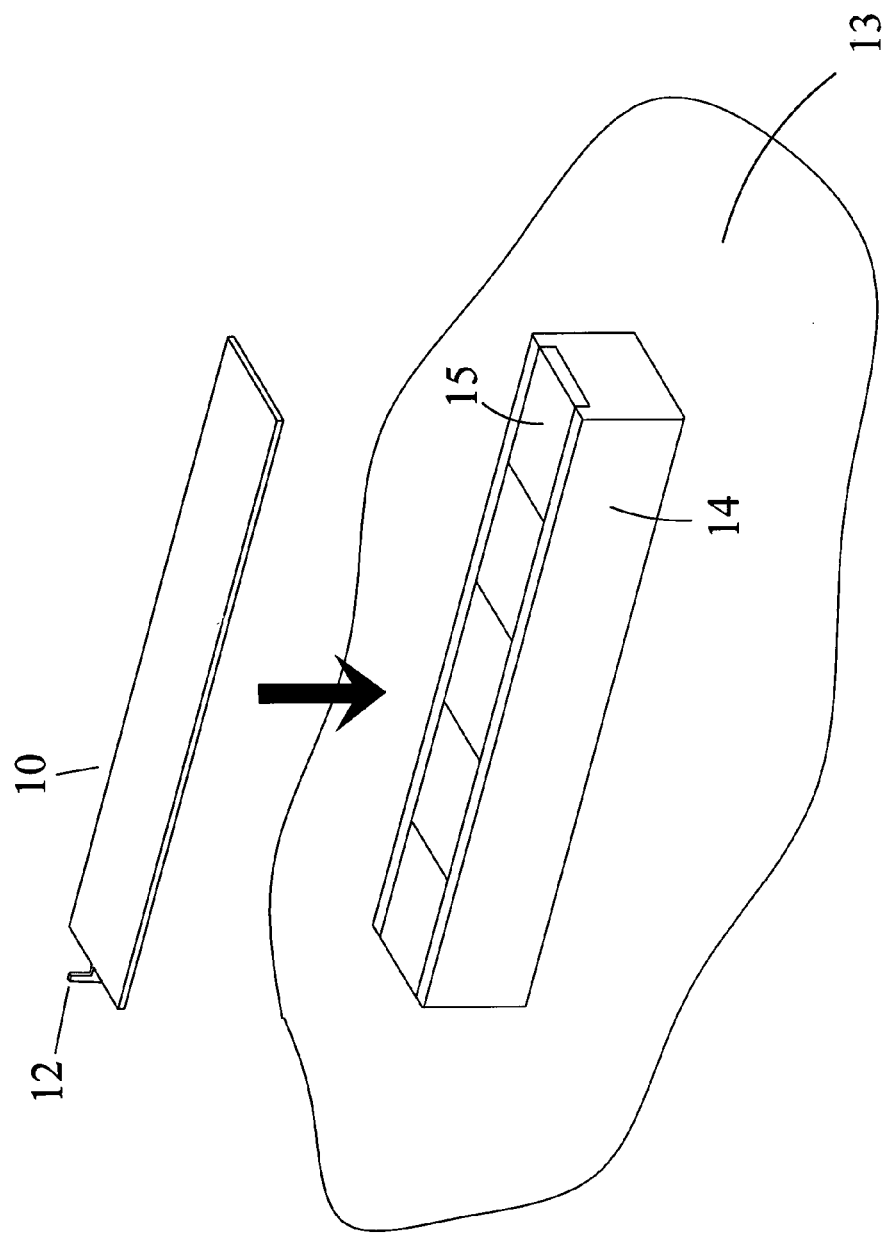
FIG. 1 is a perspective view of the mold shim being positioned over a pedestal/raised trench in a forming mold, showing the positioning post located at one end of the shim.

The following provides a list of the reference characters used in the drawings:
10. Veneer (mold shim)
11. Fastener strip
12. Positioning post
13. Forming mold
14. Pedestal
15. Magnet
16. Slot
17. Clip engaging member
18. Coating
19. Wire engaging member
20. Wire
21. Gasket
22. Magnetically attractable particle
23. Film
24. Cap As shown in FIG. 1, the main embodiment of the invention comprises a substantially flat veneer or mold shim 10, formed from non-magnetically attractable material. Mold shim 10 has a rectangular, strip-like shape corresponding to the shape of a fastener strip 11 like that shown in FIG. 2. Mold shim 10 has a positioning post 12 located at an end thereof, to facilitate positioning and alignment of fastener strip 11 on mold shim 10. Positioning post 12 extends upward from the edge of mold shim 10, and has a squared-off or flat surface facing the area where fastener strip 11 will lie.

Figure 2:
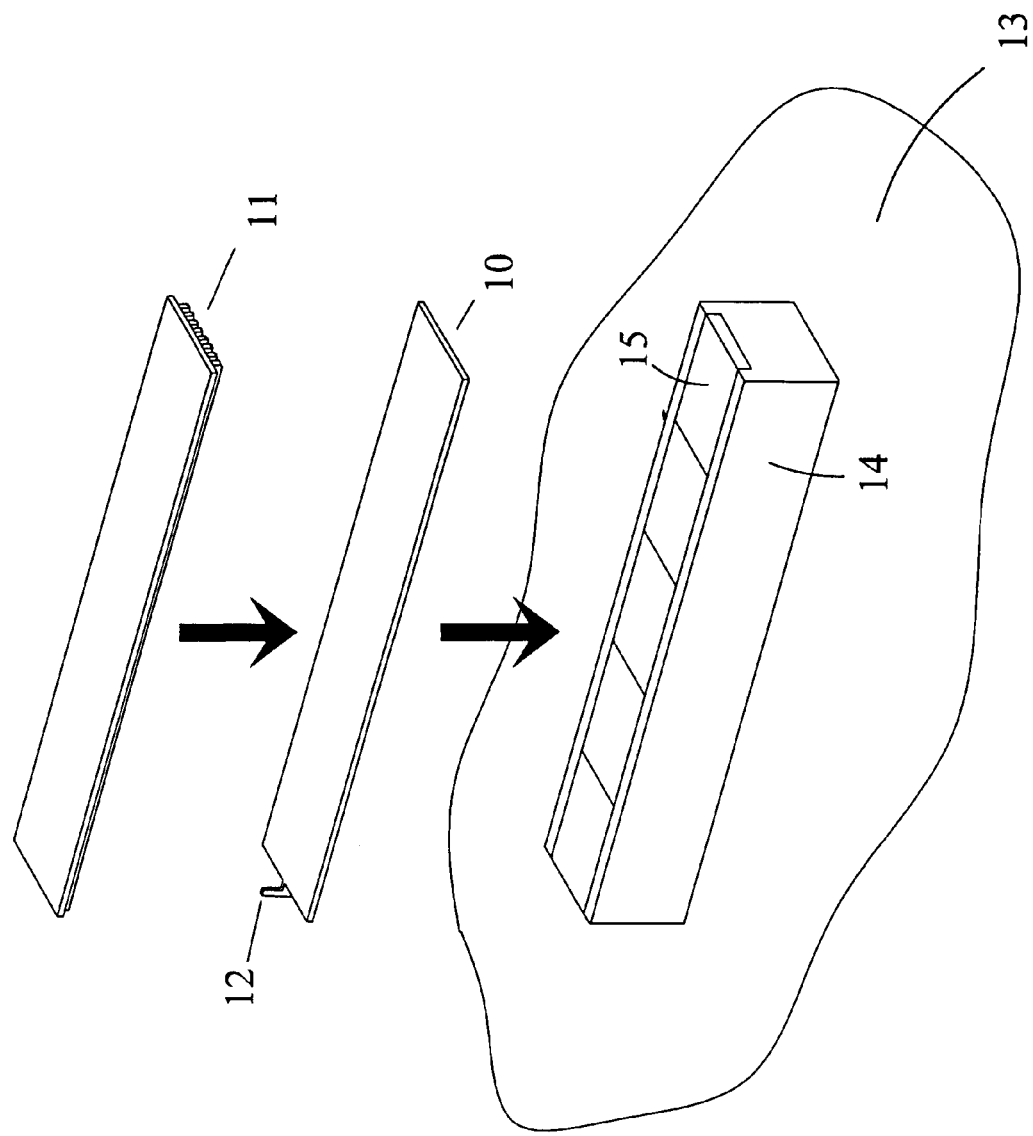
FIG. 2 is another perspective view of the mold shim and pedestal/raised trench, but also showing the fastener strip which is positioned over the mold shim, thereby sandwiching the mold shim between the pedestal/raised trench and the fastener strip.
Figure 3:
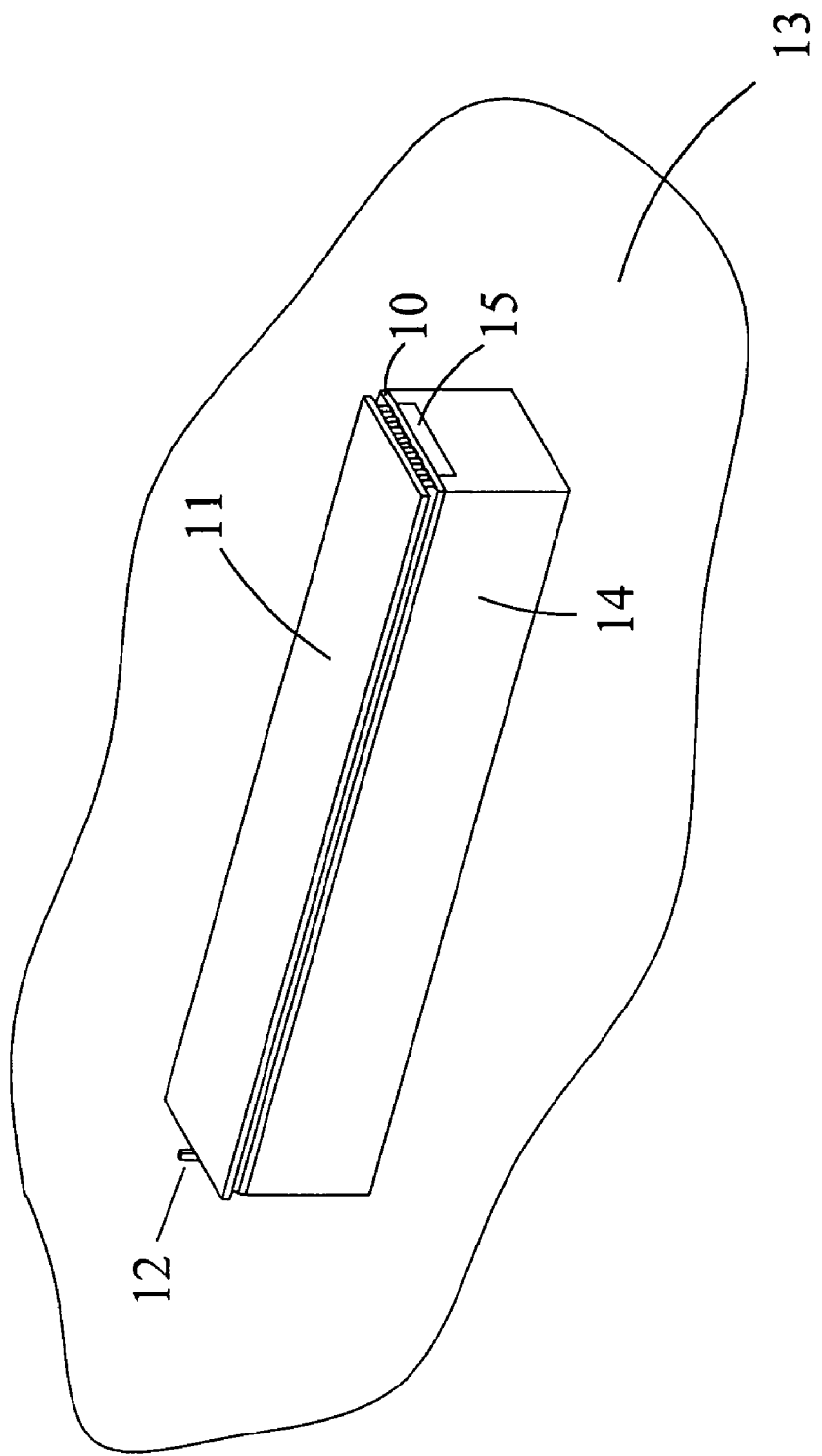
FIG. 3 is a perspective view of the mold shim and the fastener strip fully in place on the mold pedestal/raised trench.

FIGS. 1–3 all illustrate the process in which mold shim 10 is used. A foam object forming mold 13, typical of those used to form foam seat cushions for automobiles and other conveyances, has a pedestal 14 located on the inner surface thereof. In order to focus on the invention itself, the entire extent of forming mold 13 is not shown in the figures; however, the remainder of forming mold 13 can be any one of the wide variety of forming molds known in the foam object molding art.

Pedestal 14, sometimes referred to as a "trench" by those skilled in the art despite its raised nature, extends upward from the surface of forming mold 13 toward the interior of forming mold 13. Pedestal 14 also has magnets 15 located on its top surface, for holding fastener strip 11 to pedestal 14 during the molding process. Magnets 15 also serve to hold mold shim 10 to pedestal 14, in those embodiments wherein mold shim 10 is magnetically attractable.

FIGS. 2 and 3 further illustrate the process in which mold shim 10 is used.

Mold shim 10 is positioned over pedestal 14 and held in place by magnetic attraction between magnets 15 and mold shim 10. Fastener strip 11 is then positioned fastening side-down over mold shim 10, and is also held in place by magnetic attraction between magnets 15, mold shim 10 in those embodiments wherein mold shim 10 is magnetically attractable, and magnetically attractable elements contained in fastener strip 11 itself. The magnetically attractable elements in fastener strip 11 are not detailed herein, but may comprise any of the wide variety of magnetically attractable elements known in the art.

Thus, mold shim 10 is effectively sandwiched between pedestal 14 and fastener strip 11, and provides a more consistent and even surface for the side and end sealing means of fastener strip 11 to seal against during the molding process. Mold shim 10 compensates for the variability and unevenness often seen in the surfaces of forming molds, mold pedestals, and mold trenches, and helps prevent fouling of the engaging elements of the fastener strip with liquid or polymerized foam during the molding process.

When mold shim 10 and fastener strip 11 are in place on pedestal 14, as shown in FIG. 3, liquid urethane or similar molding material is poured into forming mold 13, and upon heating and polymerization a foam object is formed with fastener strip 11 molded into a recessed groove of the foam object. After molding is complete, the foam object is withdrawn from forming mold 13. Mold shim 10 remains with forming mold 13, and fastener strip 11 remains anchored in the foam object.

It can also be appreciated that during the molding process, foaming liquid may penetrate between the uneven surfaces of pedestal 14 and the bottom of mold shim 10. To the extent this occurs, the polymerized foam left between the top of pedestal 14 and the bottom of mold shim 10 helps to adhere mold shim 10 to pedestal 14 when the foam object is withdrawn from forming mold 13, so that mold shim 10 remains with forming mold 13. If this adhering action is not sufficient, then adhesive, mechanical, or other means may also be used to permanently adhere mold shim 10 to pedestal 14.

Figure 4:
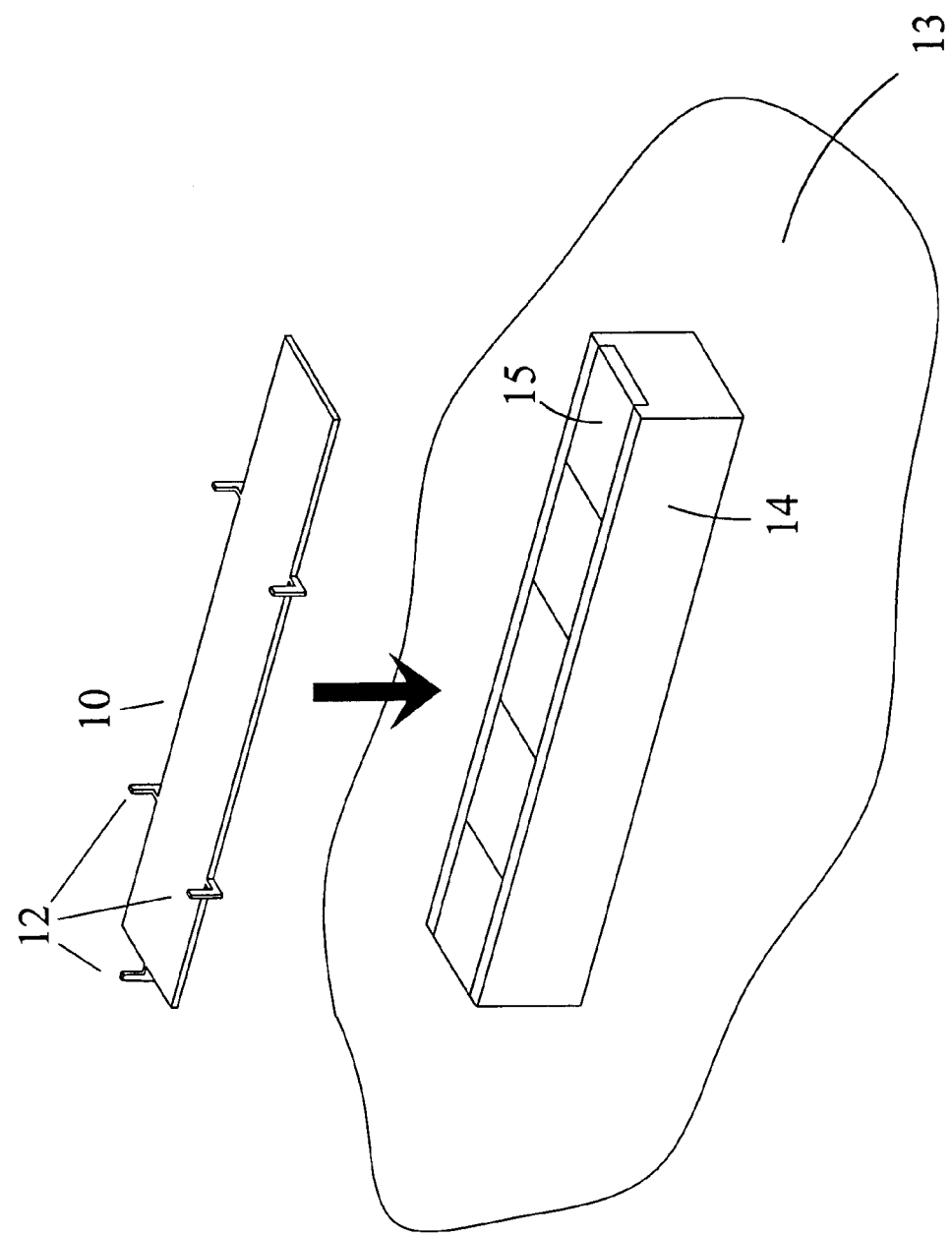
FIG. 4 is a perspective view of an alternative embodiment, wherein the mold shim has a plurality of positioning posts located around its edges, to further facilitate positioning and alignment of the fastener strip on the mold shim.

FIG. 4 illustrates an alternative embodiment, wherein the mold shim has a plurality of positioning posts 12 located around its edges, to further facilitate positioning and alignment of the fastener strip on the mold shim. Other than the increased number of positioning posts 12, the FIG. 4 embodiment has the same structure, and is used in the same manner, as the FIG. 1 embodiment.

Figure 5:
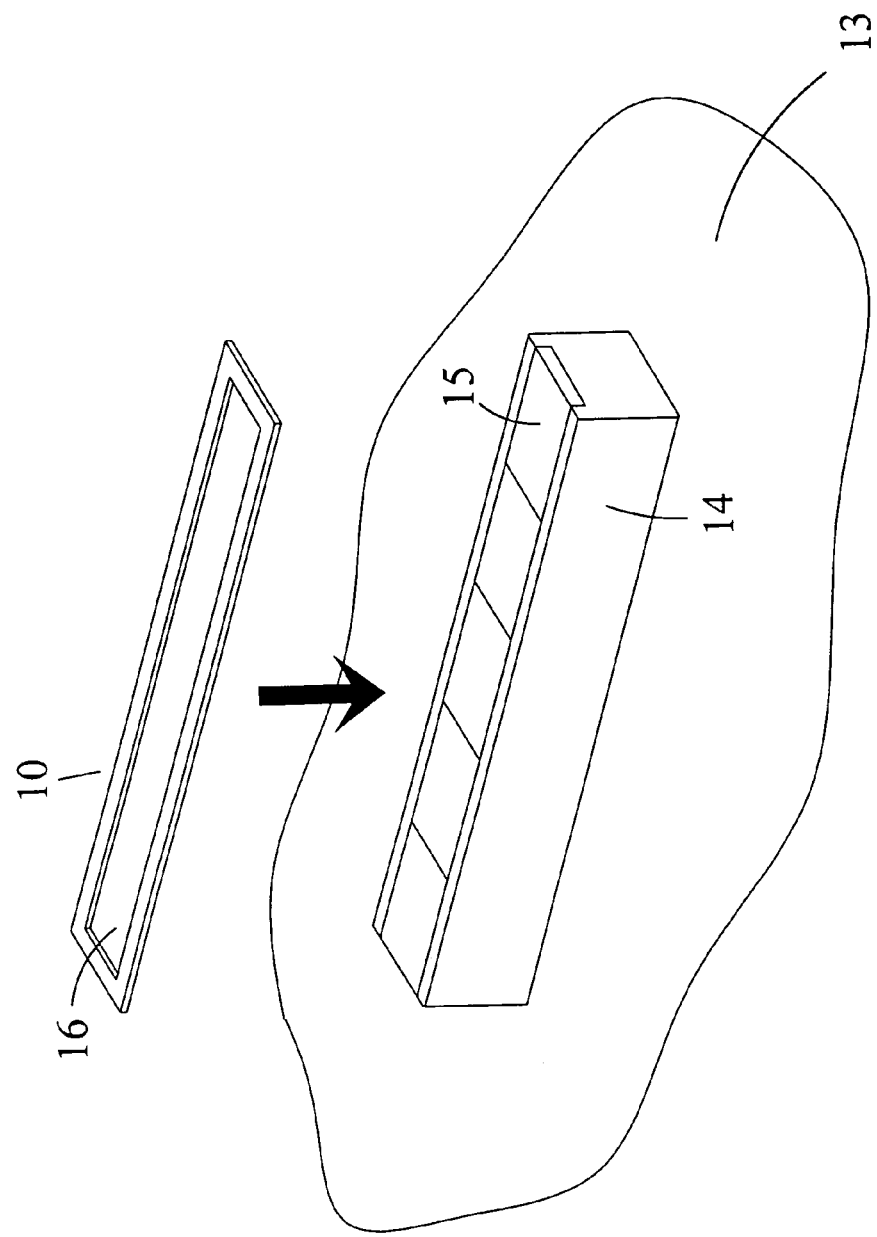
FIG. 5 illustrates another alternative embodiment, wherein the mold shim has a center slot disposed along its length, said slot creating a recessed area into which the engaging elements of the fastener strip can protrude, when the fastener strip is positioned on the mold shim.

FIG. 5 illustrates another alternative embodiment, wherein the mold shim has a slot 16 disposed along its length. Slot 16 creates a recessed area in the center of mold shim 10, into which the engaging elements of fastener strip 11 can protrude when fastener strip 11 is positioned on mold shim 10. This improves the sealing effectiveness of the sides and ends of fastener strip 11 against mold shim 10, and further prevents fouling of the engaging elements of fastener strip 11 during the molding process.

Figure 6:
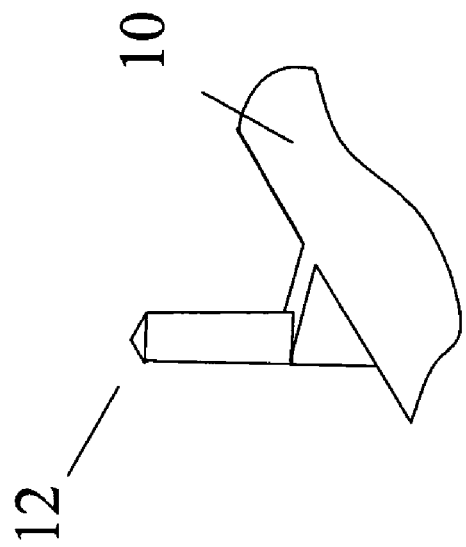
FIG. 6 illustrates another alternative embodiment, similar to that shown in FIGS. 1 and 4 except that the positioning post (which can be either a side or an end post) has a triangular or wedge surface facing the fastener strip, instead of a square or flat surface as in the FIGS. 1 and 4 embodiments.
Figure 7:
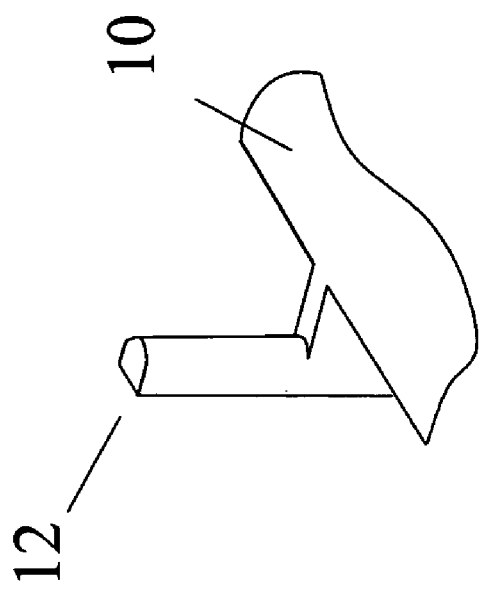
FIG. 7 illustrates another alternative embodiment, similar to that shown in FIGS. 1 and 4 except that the positioning post (which can be either a side or an end post) has a curved surface facing the fastener strip, instead of a squared-off or flat surface as in the FIGS. 1 and 4 embodiments.

FIG. 6 illustrates another alternative embodiment, similar to that shown in FIG. 1 except that positioning post 12 (which can be either a side or an end post) has a triangular or wedge surface facing the area where fastener strip 11 will lie, instead of a square or flat surface as in the FIG. 1 embodiment. FIG. 7 illustrates a similar alternative embodiment, wherein positioning post 12 (which can be either a side or an end post) has a curved surface facing the area where fastener strip 11 will lie.

Figure 8:
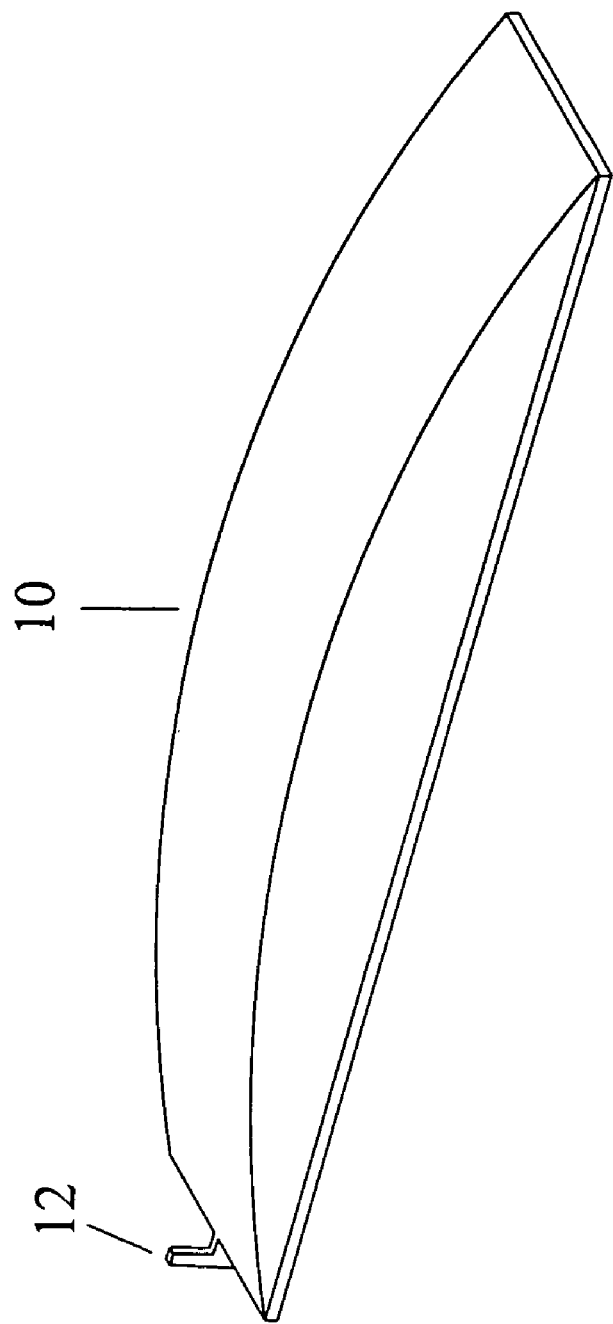
FIG. 8 illustrates another alternative embodiment, similar to that shown in FIG. 1 except that the fastener strip-proximate surface of the shim is convex, rather than being substantially flat as in the FIG. 1 embodiment.

FIG. 8 shows that mold shim 10 need not be substantially flat and plate-like as in FIG. 1, but alternatively can have a fastener strip-proximate surface with a convex shape. With this embodiment, the recessed groove in the finished foam object, and the fastener strip 11 molded into the bottom of that groove, will not be of even depth along the length of the groove.

Figure 9:
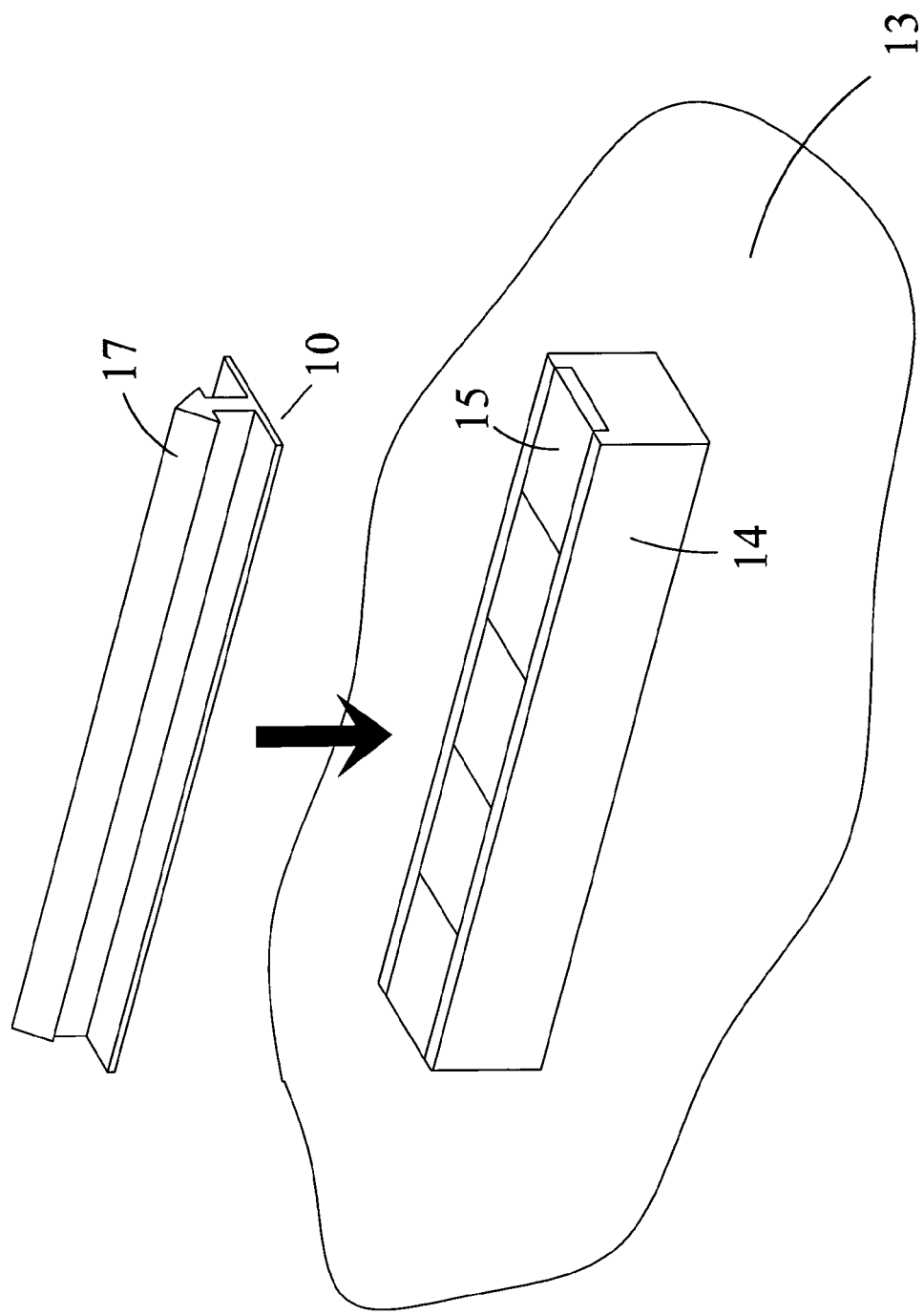
FIG. 9 illustrates another alternative embodiment, wherein the mold shim is not used with a fastener strip, and as such, has no positioning posts; however, the mold shim does have a clip engaging member on its non-mold-proximate surface which engages clips that are thereby embedded into the foam object during the molding process.

FIG. 9 illustrates another alternative embodiment, wherein mold shim 10 is not used with a fastener strip. As such, mold shim 10 has no positioning posts 12; however, mold shim 10 does have a clip engaging member 17 located on its non-mold-proximate surface. Clip engaging member 17, disposed along the length of mold shim 10 and having an arrow-shaped engaging surface, temporarily engages and holds a clip or clips up into the interior of forming mold 13 during the molding process. The clip or clips separate from clip engaging member 17 when the finished foam object is withdrawn from forming mold 13 and remain embedded in the foam object, while mold shim 10 remains with forming mold 13. While the clips are not illustrated, it can be appreciated that they may any of the various shapes or types known in the art. All that is required is that the engagement surface of clip engaging member 17 and the engagement surfaces of the clip be suitably sized and shaped so as to releasable engage each other. The clip or clips may even be held to clip engaging member 17 by magnetic attraction.

Figure 10:
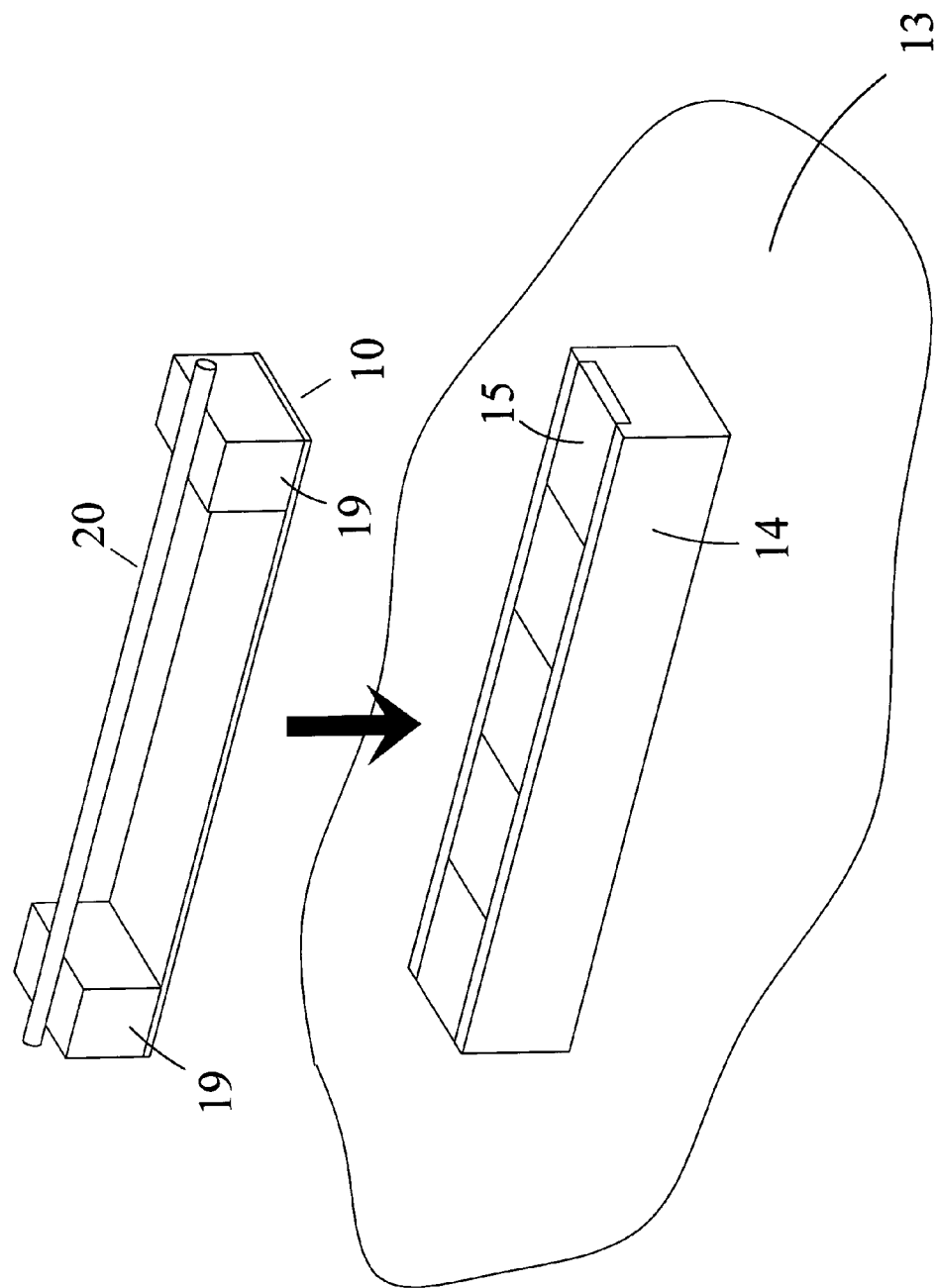
FIG. 10 illustrates another alternative embodiment, wherein the mold shim is not used with a fastener strip, and as such, has no positioning posts; however, the mold shim does have a wire engaging member on its non-mold-proximate surface which engages a wire that is thereby embedded into the foam object during the molding process.

FIG. 10 illustrates a embodiment similar to that of FIG. 9, wherein the mold shim has wire engaging members 19 on its non-mold-proximate surface that engage a wire 20 which is thereby embedded into the foam object during the molding process. In this particular embodiment, wire engaging members 19 are magnets that hold wire 20 to mold shim 10 by magnetic attraction. However, wire engaging members 19 may also have a groove or cutout incorporated into a surface thereof, in order to releasable engage wire 20.

Thus in these latter two embodiments, mold shim 10 does not serve to provide a more even and consistent sealing surface for a fastener strip, but rather serves to provide a readily changeable "platform" to which clips, wires, and the like can be attached for embedding into a foam object.

Figure 11:
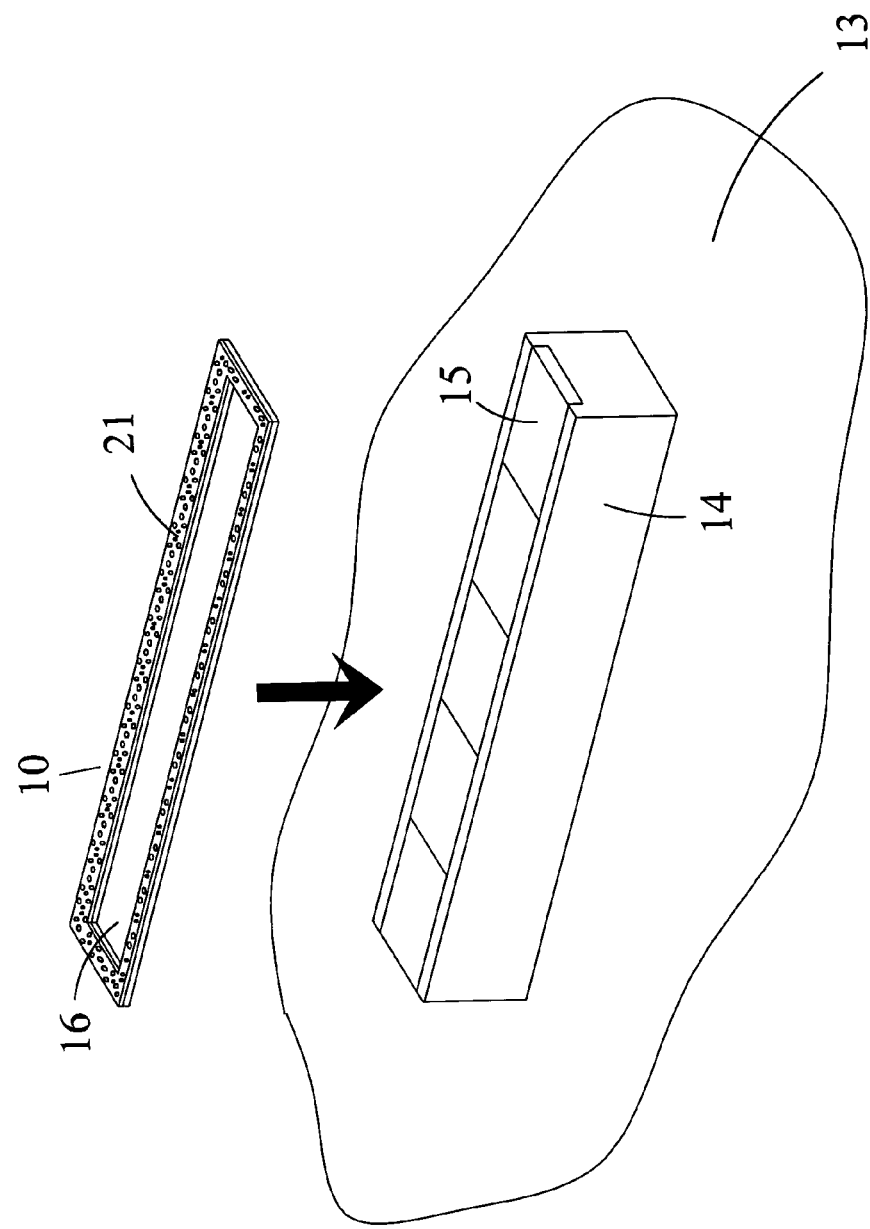
FIG. 11 illustrates another alternative embodiment, similar to that shown in FIG. 5 except that an additional sealing material or gasket is located on the fastener strip-proximate surface of the shim, around the center slot.
Figure 18:
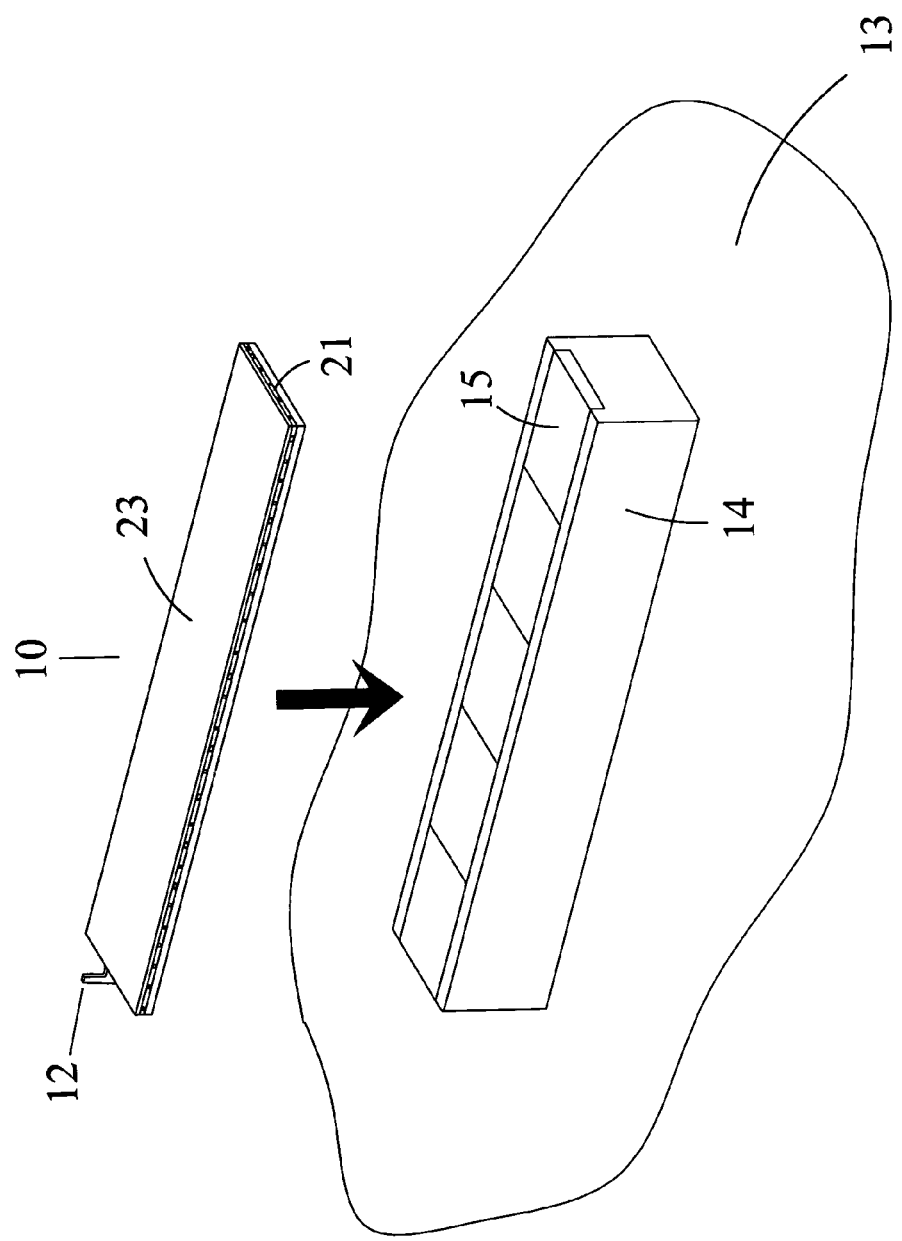
FIG. 18 illustrates another alternative embodiment, wherein the mold shim has a continuous-sheet gasket affixed to its fastener strip-proximate surface, and a non-stick film is applied on top of the gasket.
Figure 19:
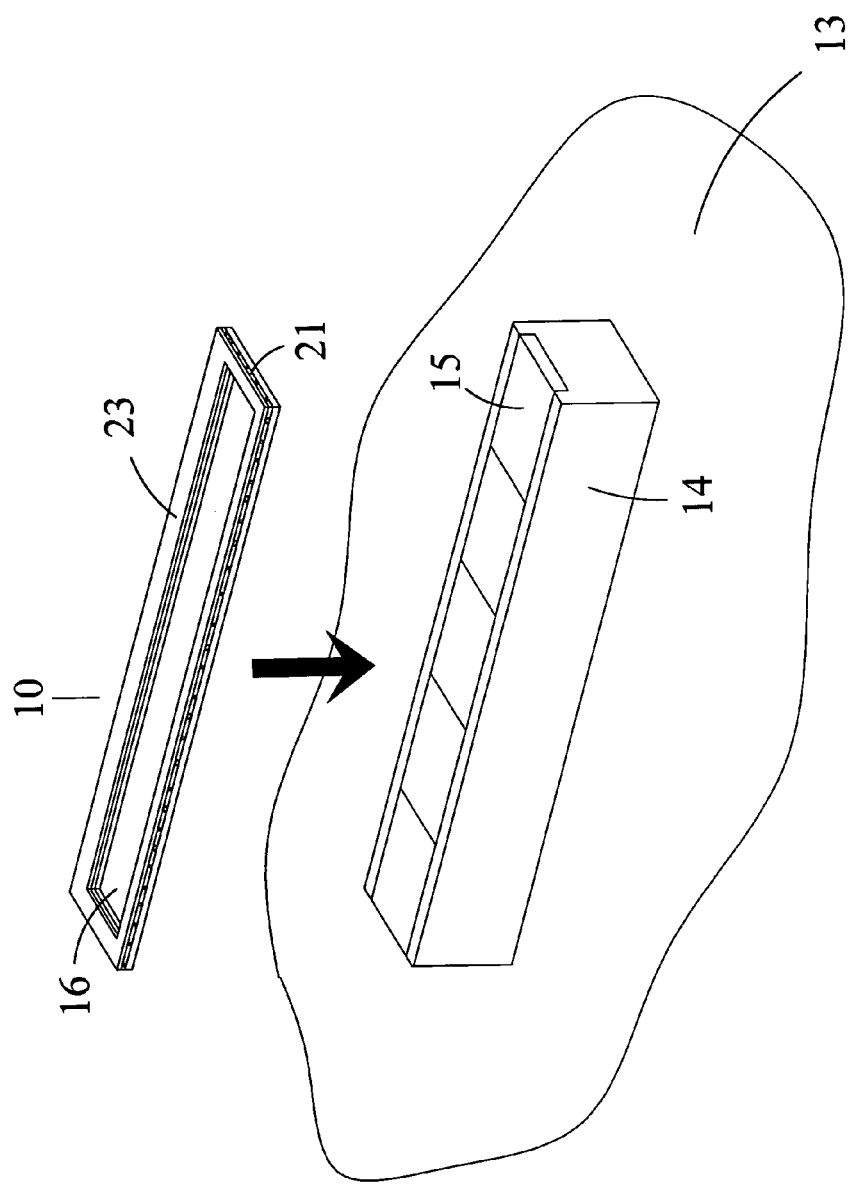
FIG. 19 illustrates another alternative embodiment, wherein a gasket is located on the fastener strip-proximate surface of the shim, around the center slot, and a non-stick film is applied on top of the gasket.

FIG. 11 illustrates another alternative embodiment, similar to that shown in FIG. 5 except that a gasket 21 is located on the fastener strip-proximate surface of mold shim 10, around the periphery of slot 16. Gasket 21 is constructed of foam or any other suitable material having sealing properties, and serves to improve the sealing of fastener strip 11 against mold shim 10. Gasket 21 may also be constructed of a sealing material having non-stick characteristics, such that polymerized foam does not stick to its outer surface, or alternatively gasket 21 may have a film attached to it and constructed of a non-stick material, as shown in FIGS. 18 and 19.

Figure 12:
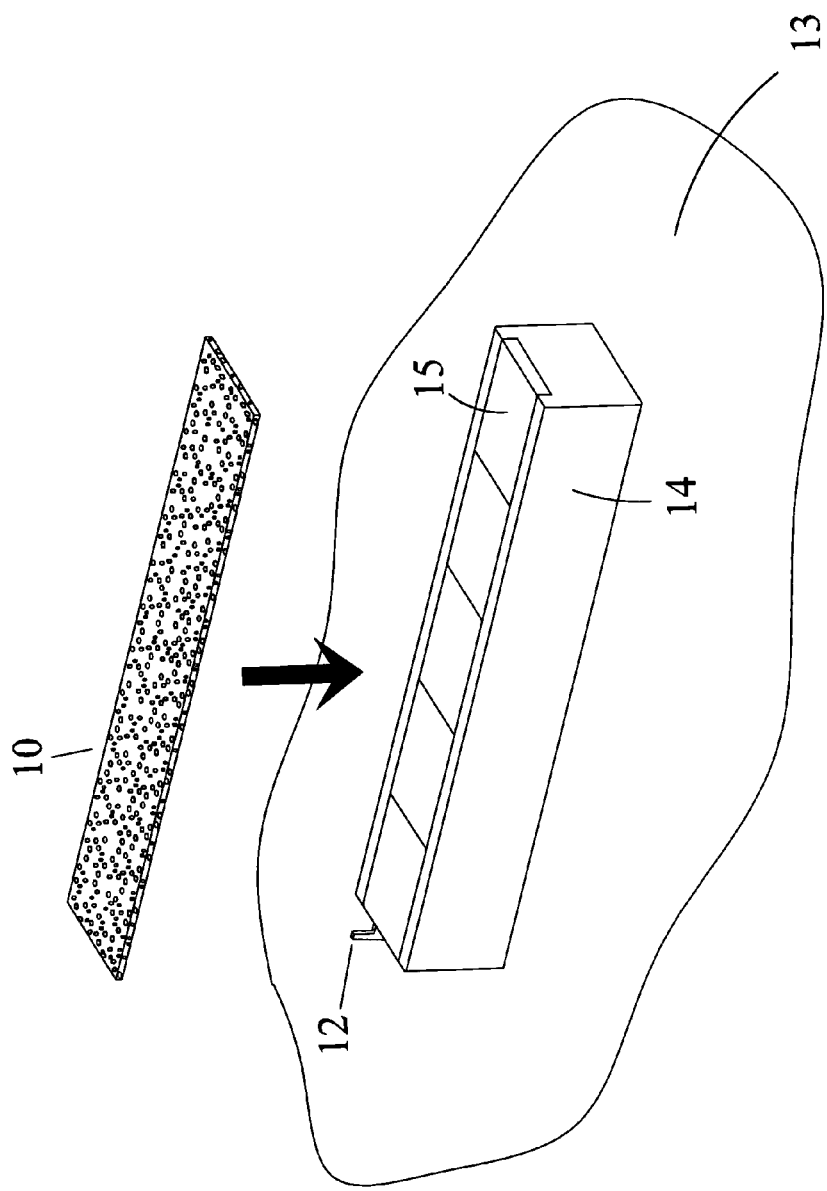
FIG. 12 illustrates another alternative embodiment, wherein the mold shim is constructed of open or closed cell foam.

FIG. 12 illustrates another alternative embodiment, wherein mold shim 10 is constructed of open or closed cell foam. In this embodiment, positioning post 12 is located not on mold shim 10, but rather on pedestal 14. Other parts and operating steps are the same as in the FIG. 1 embodiment.

Figure 13:
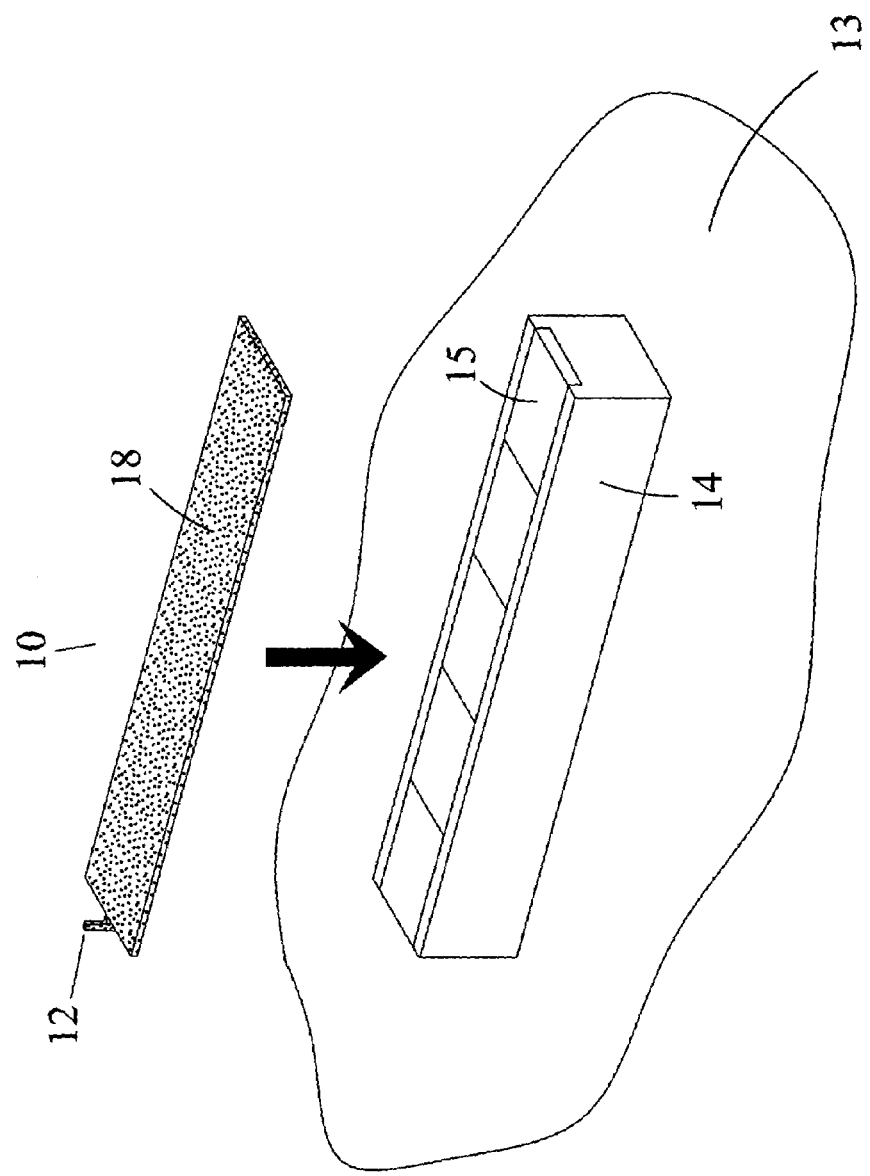
FIG. 13 illustrates another alternative embodiment, wherein the mold shim is coated with a non-stick material.

FIG. 13 illustrates another alternative embodiment, wherein mold shim 10 is coated with a non-stick coating 18, in order to prevent polymerizing foam from sticking to mold shim 10 during the molding process. Other parts and operating steps are the same as in the FIG. 1 embodiment.

Figure 14:
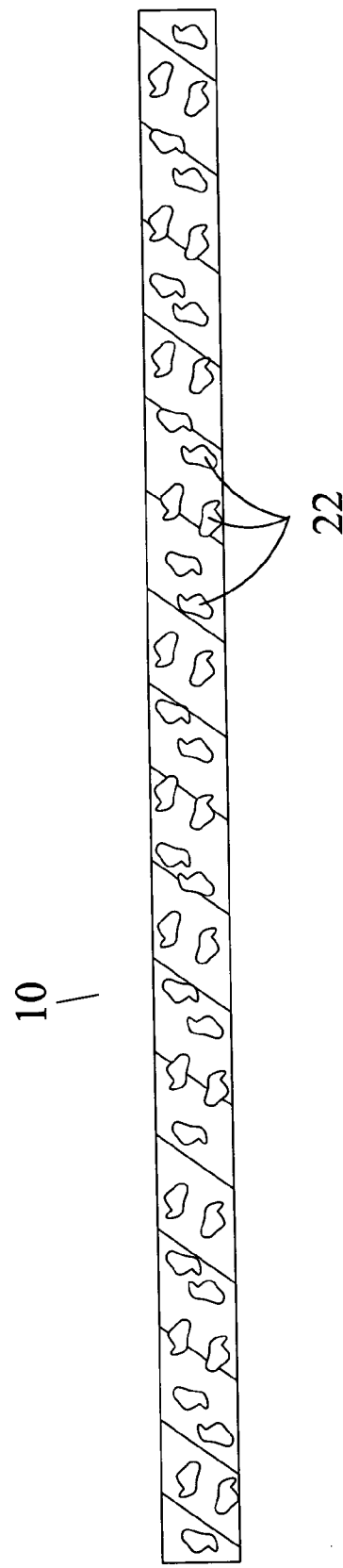
FIG. 14 is a cutaway end view of another alternative embodiment, wherein the mold shim is constructed of a composite comprising a non-magnetically attractable material with magnetically attractable particles incorporated therein.

FIG. 14 is a cutaway end view of another alternative embodiment, wherein mold shim 10 is constructed of a composite comprising a non-magnetically attractable material with magnetically attractable particles 22 incorporated therein.

Figure 15:
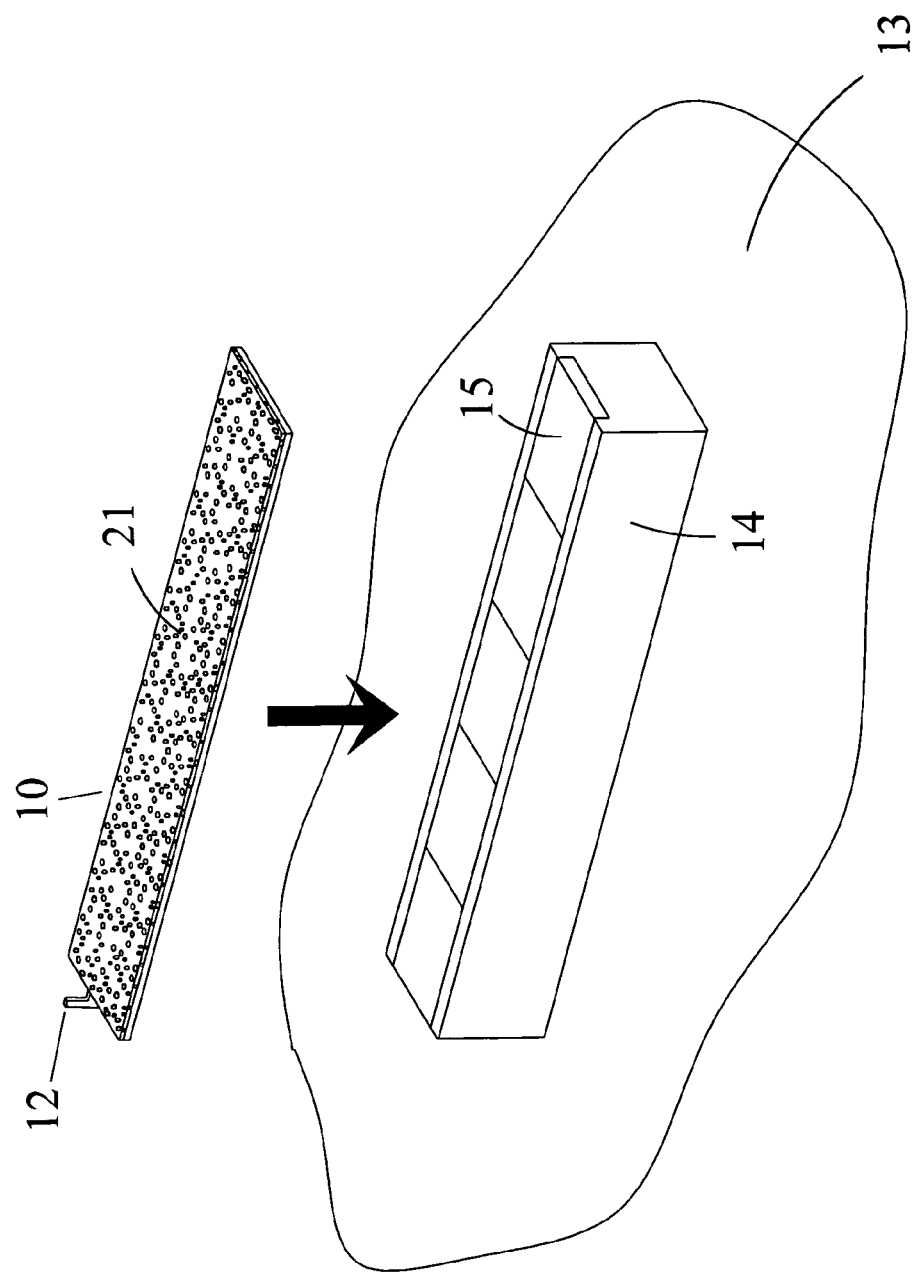
FIG. 15 illustrates another alternative embodiment, wherein the mold shim has a continuous-sheet sealing gasket affixed to its fastener strip-proximate surface.

FIG. 15 illustrates another alternative embodiment, wherein mold shim 10 has a continuous-sheet sealing gasket 21 affixed to its fastener strip-proximate surface. Other parts and operating steps are the same as in the FIG. 1 embodiment.

Figure 16:
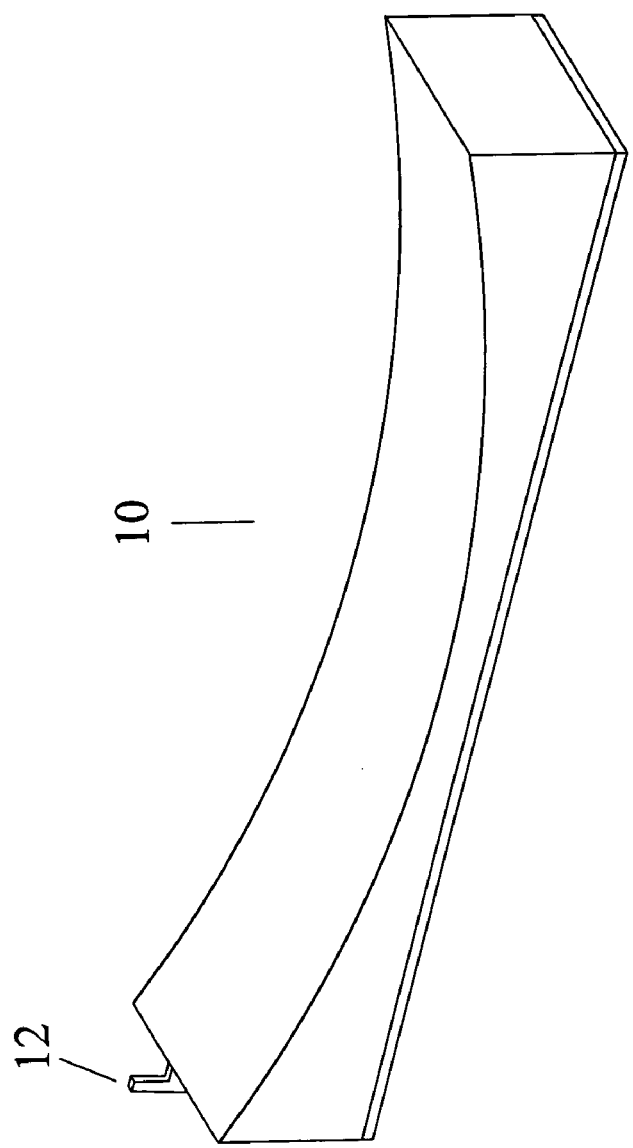
FIG. 16 illustrates another alternative embodiment, wherein the mold shim has a fastener strip-proximate surface having a concave shape.

FIG. 16 illustrates another alternative embodiment, wherein mold shim 10 has a fastener strip-proximate surface having a concave shape. As with the FIG. 8 embodiment, the recessed groove in the finished foam object, and the fastener strip 11 molded into the bottom of that groove, will not be of even depth along the length of the groove.

Figure 17:
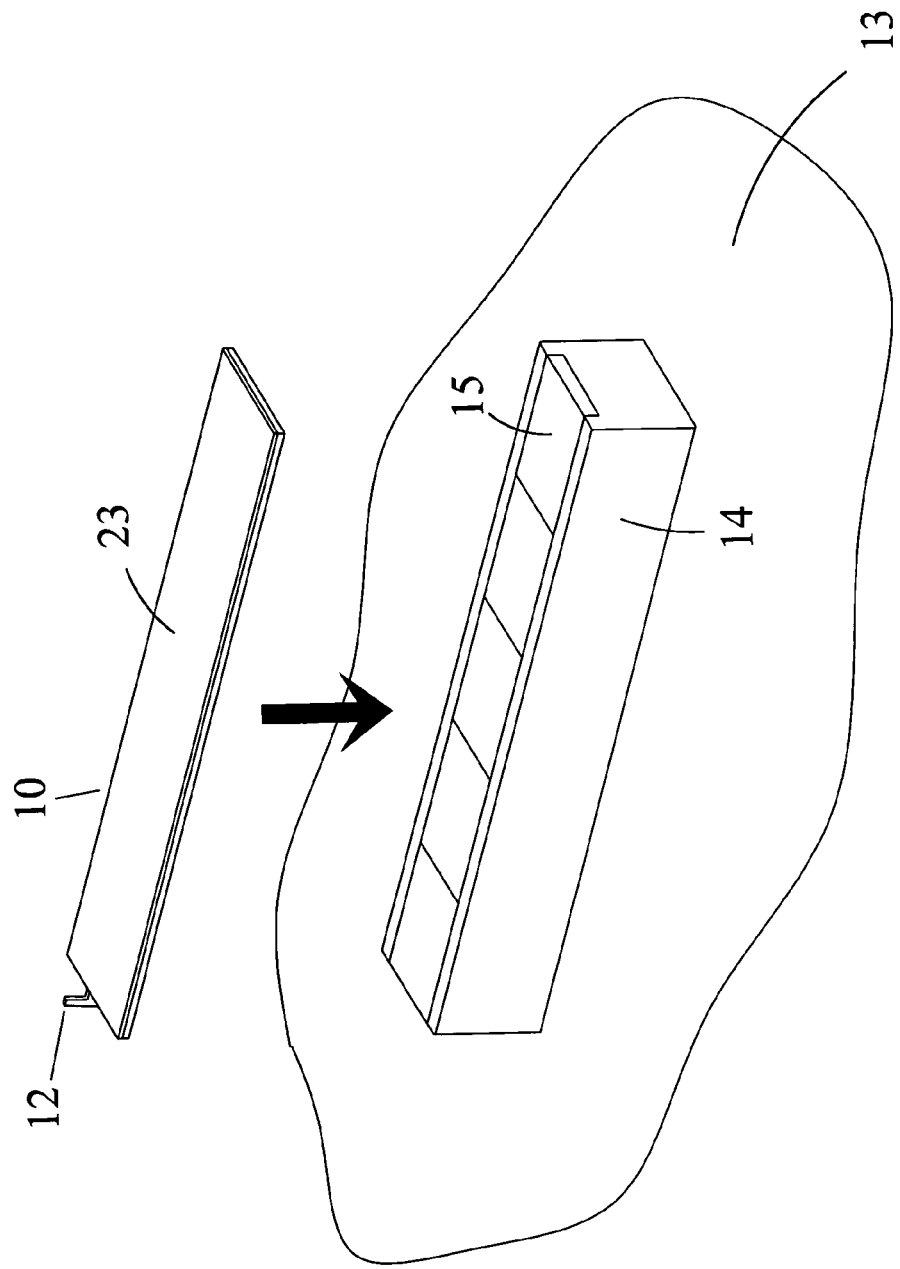
FIG. 17 illustrates another alternative embodiment, wherein the mold shim has a non-stick film attached to its fastener strip-proximate surface.

FIG. 17 illustrates another alternative embodiment similar to that shown in FIG. 1, except that mold shim 10 has a non-stick film 23 attached to its fastener strip-proximate surface. Film 23 may be formed from polyethylene or any other suitable non-stick material.

FIG. 18 illustrates another alternative embodiment similar to that shown in FIG. 15, except that mold shim 10 has a non-stick film 23 applied on top of continuous-sheet gasket 21 affixed to its fastener strip-proximate surface.

FIG. 19 illustrates another alternative embodiment similar to that shown in FIG. 11, except that mold shim 10 has a non-stick film 23 applied on top of gasket 21. As in FIG. 11, gasket 21 is located on the fastener strip-proximate surface of mold shim 10, around slot 16.

Figure 20:
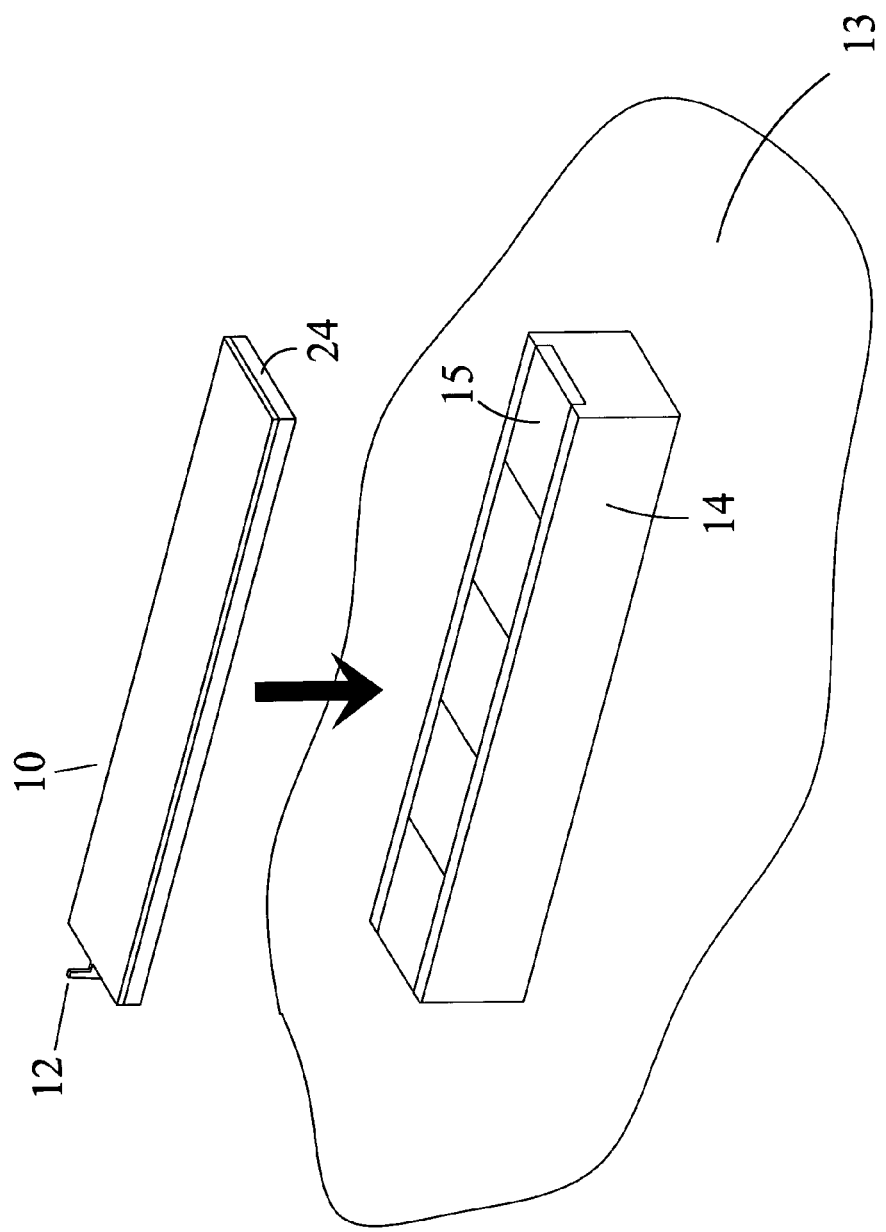
FIG. 20 illustrates another alternative embodiment, wherein a wall is located around the perimeter of the bottom surface of the mold shim, thus forming a cap which fits over the mold pedestal.

FIG. 20 illustrates another alternative embodiment, wherein a wall is located around the perimeter of the bottom surface of mold shim 10, thus forming a cap 24 which fits over pedestal 14. Thus in this embodiment, mold shim 10 fits over pedestal 14 rather than just resting on its top surface. It can be appreciated that once this embodiment has been fitted over pedestal 14, screws, bolts, rivets, or any other suitable fasteners may be used to secure the sides of cap 24 to the vertical sides of pedestal 14.

Figure 21:
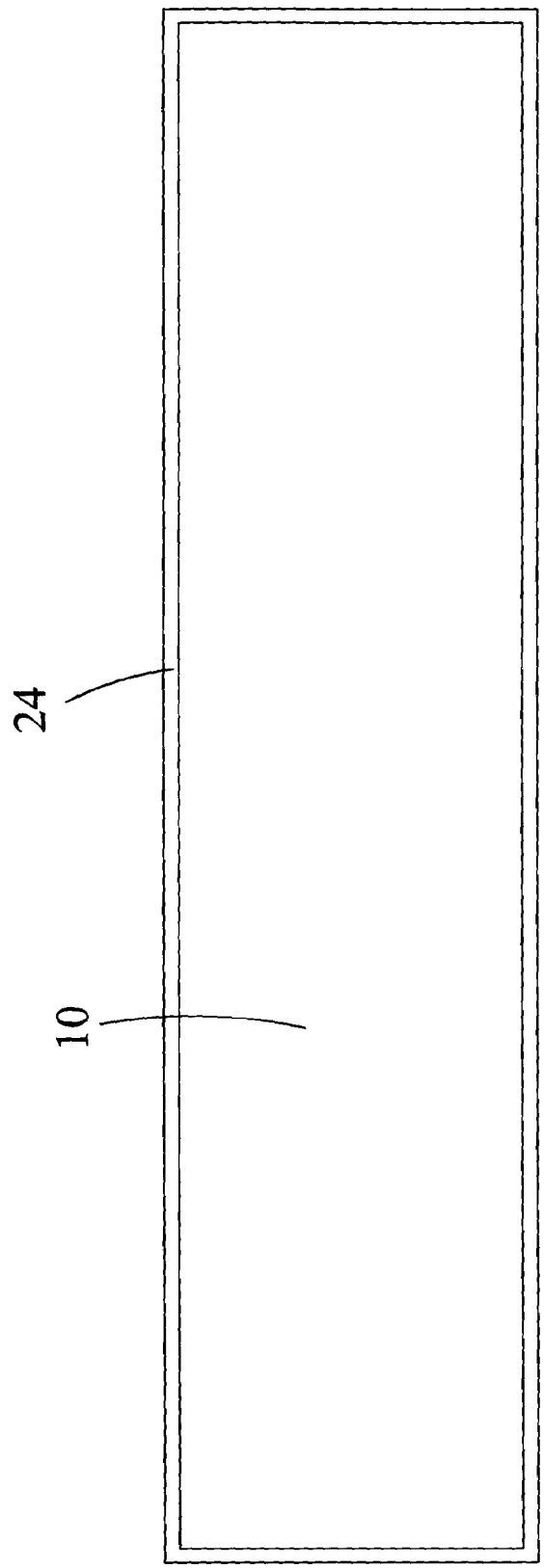
FIG. 21 is a bottom view of the FIG. 20 embodiment, illustrating the cap formed by a wall around the perimeter of the bottom of the mold shim.

FIG. 21 is a bottom view of the FIG. 20 embodiment, further illustrating cap 24 formed by a wall around the perimeter of the bottom of mold shim 10.

Conclusions, Ramifications, and Scope:

Thus the reader will see that the invention provides a very effective way of compensating for the variability of forming mold, mold pedestal, and mold trench surfaces, and providing a more even and consistent surface for the side and end seals of a fastener strip to seal against. The invention also serves as a flexible, easily changeable "platform" to which clips, wires, and the like can be attached for embedding into a foam object.

While the above descriptions contain many specificities, these shall not be construed as limitations on the scope of the invention, but rather as exemplifications of embodiments thereof. Many other variations are possible. Examples of just a few of the possible variations follow:

The mold shim of the invention can be used with a forming mold having a pedestal or raised trench, as in the various embodiments illustrated herein, or it can be placed directly on a flat, curved, or contoured mold surface.

The mold shim can be used with a trench that is recessed into the mold surface as well. If placed directly on a curved or contoured mold surface, the mold-proximate underside of the mold shim will have a correspondingly curved or contoured surface so as to fit closely against the mold surface.

In the various embodiments shown herein, the positioning posts are set off slightly from the edge of the mold shim, to allow for the fastener strip side and end edge areas that are outside the fastener strip seals. Alternatively, the positioning posts can be located even with the edge of the mold shim, with no set-off, to accommodate a fastener strip having no side or end edge areas outside the fastener strip seals. In addition, the mold shim can have a single positioning post, as exemplified by FIG. 1; a plurality of positioning posts, as exemplified by FIG. 4; or no positioning posts at all.

The overall shape of the mold shim can be different, in order to correspond to differently-shaped fastener strips or differently-shaped mold pedestals. As just one example, the mold shim can be a flat circular disc, in order to correspond to a fastener strip having a circular rather than a rectangular shape.

The coating shown in FIG. 13 can be a non-stick coating, or it can also be a coating of any other type, for any other purpose.

The mold shim of the invention can be used in any application where fastener strips, clips, wires, or other objects are being molded into a second object, and not just in the foam seat cushion (foam bun) molding application shown in the embodiments herein.

The non-mold-proximate face of the mold shim can have a different shape than the substantially flat shape of FIG. 1, the convex shape of FIG. 8, or the concave shape of FIG. 16. As just two examples, the non-mold-proximate face of the mold shim can have a wavy or irregularly curved shape—all of which would produce a groove in the molded object having a different profile, or depth along its length.

Although the mold shim is preferably constructed of non-magnetically attractable material, it may also be formed from another non-magnetically attractable material, including but not limited to plastic, polymers, or a compressible material such as foam. Further, the mold shim may be formed from a magnetically attractable material, including but not limited to iron, carbon steel, or magnetically attractable stainless steel. The mold shim may also be a composite, comprised of a non-magnetically attractable material with magnetic or magnetically attractable content incorporated therein (as shown in FIG. 14). Further, the mold shim may itself be a magnet, and magnets are of course also magnetically attractable. Finally, the mold shim may also be constructed of a magnetically attractable border area surrounding a recessed center area containing magnets.

As initially discussed above, adhesive can be used to permanently affix the mold shim to the forming mold if a non-magnetically attractable material is used for the mold shim, or if the magnetic attraction between the mold magnets and a magnetically attractable mold shim is not sufficient to retain the mold shim in the mold when the finished foam object is removed from the forming mold. Various mechanical means, including but not limited to screws, rivets, and the like, may also be used to permanently affix the mold shim to the forming mold.

The cap can be comprised of walls around three, two, or even just one bottom edge of the mold shim, rather than the four wall/perimeter embodiment shown in FIGS. 20 and 21. In the case where the cap has fewer than four walls, the cap can be thought of as more of a "tab" that facilitates fastening of the mold shim to the vertical sides of the mold pedestal. In addition, it should be understood that the cap or tab can just as easily and effectively be applied to the mold shims shown in FIGS. 9 and 10, which do not work with a fastener strip.

In addition, the means for holding the fastener strip to the mold shim can be different than the magnetic means described earlier. As just one example, the fastener strip can be temporarily held to the mold shim by mechanical means during the molding process.

The engaging members on the mold shim can be different than that shown in FIGS. 9 and 10, in order to engage clips, wires, or other devices having different structures. All that is required is that the engaging member be suitably structured to releasably engage the device that is desired to be molded into the foam object.

The sealing gasket shown in FIG. 11 can also be applied to the other embodiments that do not have a center slot. In using a sealing gasket with these other embodiments, the gasket can be either the perimeter seal shown in FIG. 11 or it can alternatively comprise a continuous sheet of sealing material affixed to the fastener strip-proximate surface of the mold shim (as shown in FIG. 15). The sealing gasket can be constructed not only of foam, but also of any suitably compressible material including but not limited to fiber, gel, or a non-woven material. Similarly, the foam mold shim shown in FIG. 12 can be constructed of any suitably compressible material.

Accordingly, the scope of the invention should be determined not by the embodiments illustrated, but by the appended claims and their legal equivalents.

What is claimed is:

1. A mold, comprising:
   a pedestal protruding from a mold surface toward an interior of the mold;
   a plurality of magnets located at a top surface of the pedestal; and
   a veneer located at the top surface of the pedestal, the veneer permanently adhered to the pedestal and covering the plurality of magnets;
   wherein the veneer has an exposed outer surface having a substantially smoother contour than the top surface of the pedestal.

2. The mold of claim 1, wherein said veneer is constructed of a non-magnetically attractable material.

3. The mold of claim 2, wherein said veneer is constructed of non-magnetically attractable stainless steel.

4. The mold shim of claim 1, wherein said mold shim is constructed of a magnetically attractable material.

5. The mold shim of claim 1, wherein said mold shim is composite comprising a non-magnetically attractable material with magnetically attractable particles incorporated therein.

6. The mold of claim 1, wherein said veneer is a substantially flat rectangular strip.

7. The mold of claim 1, wherein said veneer comprises at least one positioning post located on an end edge thereof.

8. The mold of claim 1, wherein said veneer has a curved shape.

9. The mold of claim 8, wherein said veneer has a convex shape.

10. The mold of claim 8, wherein said veneer has a concave shape.

* * * * *